United States Patent [19]
Peters

[11] 3,959,656
[45] May 25, 1976

[54] X-RAY FILM APPARATUS

[76] Inventor: Arnold Peters, 15 N. 5th Ave., Highland Park, N.J. 08904

[22] Filed: Oct. 29, 1974

[21] Appl. No.: 518,252

[52] U.S. Cl. .............................. 250/476; 250/491
[51] Int. Cl.² ...................................... G03B 41/10
[58] Field of Search ....... 250/475, 476, 492, 492 A, 250/491

[56] References Cited
UNITED STATES PATENTS

| | | | |
|---|---|---|---|
| 2,141,857 | 12/1938 | Gamble | 250/476 |
| 3,573,455 | 4/1971 | Suierveld | 250/476 |
| 3,577,160 | 5/1971 | White | 250/476 |
| 3,588,347 | 6/1971 | Montone et al. | 250/492 |
| 3,745,358 | 7/1973 | Firtz et al. | 250/492 A |

*Primary Examiner*—Alfred E. Smith
*Assistant Examiner*—B. C. Anderson
*Attorney, Agent, or Firm*—Robert A. Green

[57] ABSTRACT

The apparatus comprises an apertured lead plate and a film-holding tray for use therewith, with the tray carrying marking or calibration guides which permit the film to be exposed in several positions with respect to the aperture whereby a single sheet of film can be used to take a plurality of X-ray pictures.

9 Claims, 10 Drawing Figures

X-RAY FILM APPARATUS

BACKGROUND OF THE INVENTION

At the present time, in X-ray work, a single sheet of film is used each time an X-ray picture is taken. It can be seen that such a system is wasteful, both in film used and in time spent developing the film, and that considerable economies could be effected if a single piece of film could be used to take a plurality of X-ray pictures. However, at the present time, there is no suitable apparatus available for such a purpose.

SUMMARY OF THE INVENTION

The apparatus comprises an apertured lead plate and a film-holding tray for use therewith, with the tray being constructed to cooperate with the apertured plate in such a way as to permit selected numbers of X-ray pictures to be taken with a single sheet of film.

DESCRIPTION OF THE PREFERRED EMBODIMENTS

Figure 1:
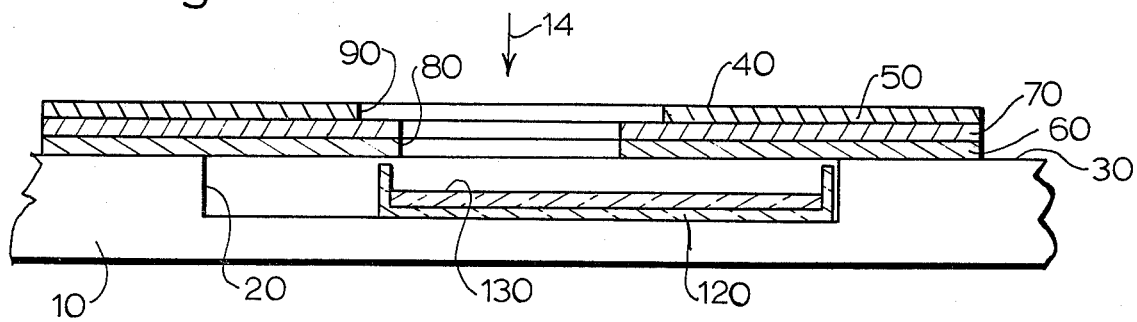
FIG. 1 is a sectional view of apparatus embodying the invention.
Figure 2:
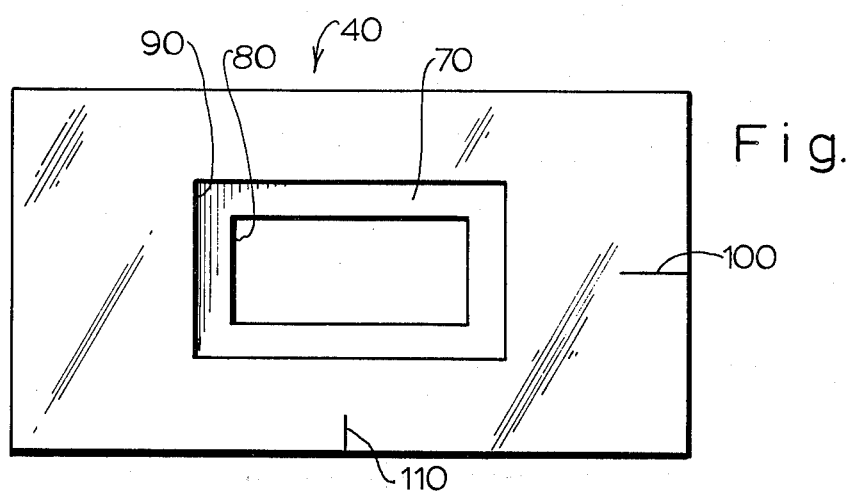
FIG. 2 is a plan view of a portion of the apparatus of the invention.

Apparatus embodying the invention is used with a conventional X-ray table 10, shown schematically in FIG. 1, which supports the portion of the body being X-rayed by radiation represented by arrow 14. The table includes a chamber 20 beneath its top surface 30, in which a film-holding tray is inserted, as is well known in the art.

The apparatus of the invention includes a masking device 40, 24 inches × 28 inches, which comprises a sandwich structure including top and bottom plates 50 and 60 of metal, plastic, wood, or the like, between which is placed a thin sheet of lead 70, about one-sixteenth inch thick. The masking device is provided with a generally rectangular aperture at its center, with the lead sheet 70 and the bottom plate 60 having the same size aperture 80, whose dimensions, in one embodiment of the invention, are 7 inches × 8½ inches, and the top plate having a somewhat larger aperture 90, for example 8 inches × 10 inches, for a purpose to be described. The dimensions of the apertures 80 and 90 are considered to be merely illustrative of one embodiment of the invention. The top plate 50 has a horizontal marker 100 oriented on its long axis, and a similar vertical marker 110 oriented on its short axis. The portions of the masking device are secured together in any suitable manner.

The apparatus of the invention also includes a film-holding tray 120 (FIG. 3) about 17 inches × 29 inches of metal, plastic, or the like, which is adapted to carry a film cassette 130, the film being typically 14 inches × 17 inches. The tray is generally rectangular and includes an upper portion which supports the film cassette and a lower portion which carries horizontal 132 and vertical 134 guide markers. In one embodiment of the invention, the horizontal guide markers 132 include a first horizontal marker carrying the numerical designation 12, a second horizontal marker carrying numerical designations 4 and 6, a third horizontal marker carrying a designation 12, a fourth carrying the designations 4 and 6, and a fifth marker carrying the designation 12. The vertical markers carry the designations 12, 6, 4, etc., as shown. The horizontal and vertical markers are specially positioned with respect to the masking device, the apertures therein, and its markers 100 and 110, to permit different numbers of film exposures to be made as described below.

Figure 3:
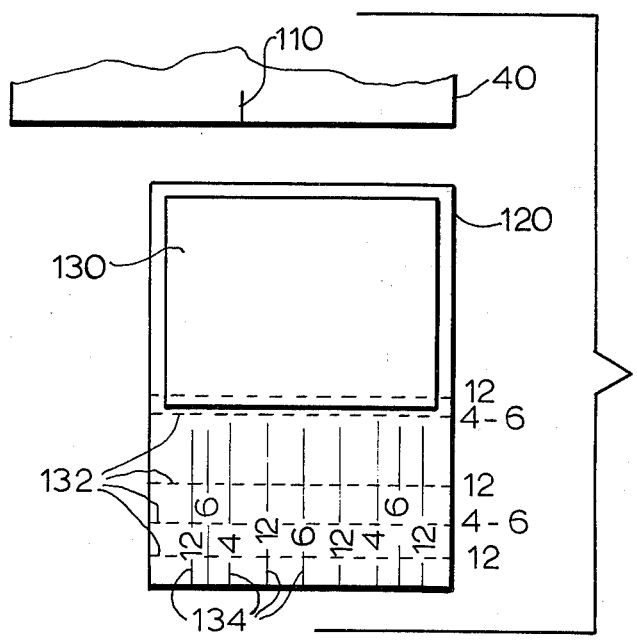
FIG. 3 is a plan view of the apparatus of the invention illustrating its operation.
Figure 4:
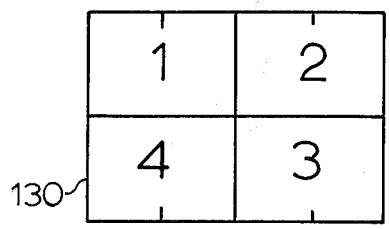
FIG. 4 is a plan view showing exposures of X-ray film using the invention.

In operation of the invention, assuming that four pictures are to be taken on a single sheet of film 130 as shown in FIG. 4, film cassette 130 is placed on the tray 120 with its lower edge aligned with the first horizontal marker line denoted 4, as shown in FIG. 3. The tray 120 is then inserted in the chamber 20 in the patient-support table 10, and the first vertical 4 marker is aligned with the marker 110 on the masking device (FIG. 3). Assuming that the film is made up of four quarters, this places the upper lefthand quarter of the film in the aperture in the masking device. With the patient suitably positioned over the opening in the masking device, the first picture is taken. Next, the tray 120 is moved to the left until the second vertical 4 marker is aligned with the marker 110 on the masking device. This places the upper righthand quarter of the film in the aperture, and a second picture is taken. Next, the tray is withdrawn, and the film 130 is positioned so that its lower edge is aligned with the second, lower horizontal 4 marker, and the tray is then reinserted, with the first vertical 4 marker aligned with the guide 110 on the masking device. This positions the lower left quarter of the film in the aperture, and the third picture is taken. The tray is then moved to the left until the second vertical 4 marker is aligned with the marker on the masking device, and the fourth picture is taken.

Figure 5:
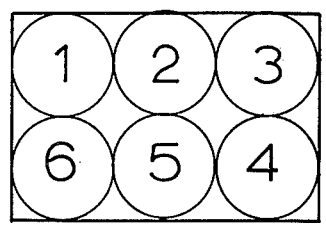
FIG. 5 is a plan view of a piece of X-ray film exposed with a modification of the invention.
Figure 6:
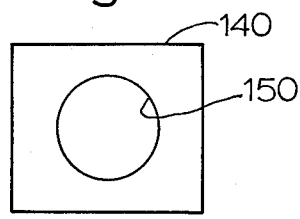
FIG. 6 is a plan view of apparatus used with the apparatus of the invention.
Figure 7:
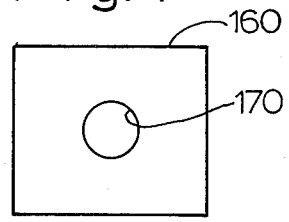
FIG. 7 is a modification of the apparatus of FIG. 6 for use with the invention.
Figure 8:
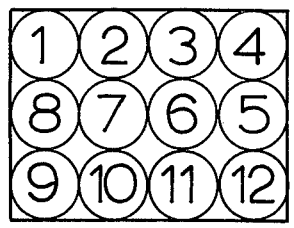
FIG. 8 is a plan view of a piece of X-ray film showing a different number of exposures therein.

With the particular markers shown and with specially shaped inserts placed in the aperture 90 in the top plate of the masking device, other numbers of pictures can be taken, for example, six, 12, or the like. For example, if desired, six circular pictures, as shown in FIG. 5, can be taken using an insert 140 of the type shown in FIG. 6 for a circular aperture 150. In this case, the film would be placed in turn at each horizontal 4–6 line as described above, and the tray would be aligned with marker 110 and each vertical 6 line in turn. With an insert 160 having a still smaller circular aperture 170 (FIG. 7), 12 pictures, as shown in FIG. 8, could be taken, with the film being positioned at the horizontal 12 markers in turn, and, at each such marker, having the tray moved so that the four vertical 12 markers are aligned in turn with the marker 110 on the masking device.

Figure 9:
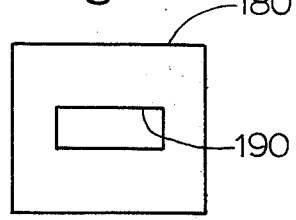
FIG. 9 is a plan view of still another modification of apparatus used with the invention.
Figure 10:
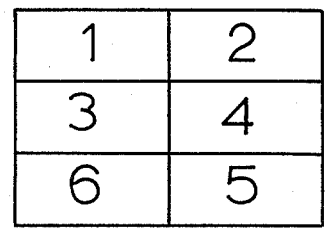
FIG. 10 is a plan view of X-ray film showing exposures made therein with the apparatus of FIG. 9.

An insert 180 of the type shown in FIG. 9 having a rectangular aperture 190 can be used to produce six pictures on a piece of film, generally as illustrated in FIG. 10, by aligning the film with the horizontal 12 lines and the tray with the vertical 4 lines.

It is noted that the inserts 140, 160, and 180, like member 40, may be formed as a sheet of lead between sheets of metal or an insulating material, with all three component parts being provided with the desired aperture.

It is clear that other types and sizes of apertured inserts can be used with suitable horizontal and vertical dimensioned guides to take other numbers of pictures with a single piece of film. In addition, the numerical dimensions given are merely illustrative for one size of film and may be varied as required.

What is claimed is:

1. X-ray film exposing apparatus comprising
    a plate comprising a frame impervious to X-rays and having an aperture through which X-rays can pass,
    means for changing the size of said aperture in accordance with the number of exposures to be made on a sheet of film,
    a horizontal and vertical plate guide marker on said frame, each marker being aligned with a line which divides said aperture into portions,
    an X-ray film holding tray adapted to be positioned beneath said plate and carrying a plurality of groups of horizontal and groups of vertical film guide markers,
    said tray being adapted to carry X-ray sensitive film,
    said tray being movable with respect to said plate so that each vertical marker of a group can be separately aligned with said vertical guide marker on said plate, and each horizontal guide marker of a group can be separately aligned with said horizontal guide marker on said plate whereby a plurality of sectors of said film can be positioned in said aperture in said plate to receive X-ray radiation therethrough.

2. The apparatus defined in claim 1 wherein each guide marker comprises a line-like indicator and a reference numeral, the numeral representing the number of exposures which can be made on a sheet of film.

3. The apparatus defined in claim 1 wherein said plate, except for the aperture therein, is impervious to said radiation.

4. The apparatus defined in claim 1 wherein said support comprises a tray having an upper portion for supporting said film and a lower portion carrying said horizontal and vertical guide markers.

5. The apparatus defined in claim 1 wherein said horizontal markers are such that, when a portion of said film is aligned with each such marker, a different region of said film is disposed in said aperture.

6. The apparatus defined in claim 1 wherein each of said vertical markers, when aligned with said guide marker on said plate, positions a different region of said film in said aperture.

7. The apparatus defined in claim 1 wherein said support includes an apertured sheet of lead which is impervious to said radiation whereby said radiation passes only through said aperture.

8. The apparatus defined in claim 1 wherein said support comprises a laminated structure including a sheet of lead between a top sheet and a bottom sheet.

9. The apparatus defined in claim 1 wherein said sheet of lead and said bottom sheet have aligned apertures of the same size and said top sheet has a somewhat larger aperture aligned therewith so that radiation can pass through all of said apertures.

* * * * *